US012515171B2

(12) United States Patent
Miller et al.

(10) Patent No.: US 12,515,171 B2
(45) Date of Patent: Jan. 6, 2026

(54) OXIDATION OF CESIUM AS METHOD FOR REMOVING CESIUM VAPOR FROM COVER GAS IN NUCLEAR REACTORS

(71) Applicant: TerraPower, LLC, Bellevue, WA (US)

(72) Inventors: Sally A. Miller, Seattle, WA (US); Christopher M. Regan, Seattle, WA (US); John E. Truax, Bellevue, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 464 days.

(21) Appl. No.: 18/302,778

(22) Filed: Apr. 18, 2023

(65) Prior Publication Data

US 2024/0017212 A1 Jan. 18, 2024

Related U.S. Application Data

(60) Provisional application No. 63/388,981, filed on Jul. 13, 2022.

(51) Int. Cl.
*B01D 53/82* (2006.01)
*B01D 39/20* (2006.01)
*B01D 53/46* (2006.01)
*G21C 19/303* (2006.01)

(52) U.S. Cl.
CPC ......... *B01D 53/82* (2013.01); *B01D 39/2027* (2013.01); *B01D 53/46* (2013.01); *G21C 19/303* (2013.01); *B01D 2251/102* (2013.01); *B01D 2251/602* (2013.01); *B01D 2257/93* (2013.01)

(58) Field of Classification Search
None
See application file for complete search history.

(56) References Cited

U.S. PATENT DOCUMENTS

| | | | |
|---|---|---|---|
| 2,745,552 | A | 5/1956 | Bruggeman et al. |
| 3,804,709 | A | 4/1974 | Penrose et al. |
| 3,853,504 | A | 12/1974 | Buscher et al. |
| 3,993,453 | A | 11/1976 | Ross et al. |
| 4,040,903 | A | 8/1977 | Monroe, Jr. |

(Continued)

FOREIGN PATENT DOCUMENTS

| | | |
|---|---|---|
| CN | 101168128 A | 4/2008 |
| CN | 108780667 A | 11/2018 |

(Continued)

OTHER PUBLICATIONS

Barton, Prototype Applications Loop (PAL) and Sodium Characterization System (SCS) Investigations, Hanford Engineering Development Laboratory, Nov. 1973, 39 pages.

(Continued)

*Primary Examiner* — John J Figueroa
(74) *Attorney, Agent, or Firm* — FisherBroyles, LLP; Jeremy P. Sanders

(57) ABSTRACT

A method of removing cesium vapor from a cover gas stream in a nuclear reactor includes the steps of oxidizing the cesium vapor in the cover gas stream to yield cesium oxide particles and removing the cesium oxide particles using a particle filter. The method yields a filtered cover gas having zero to about 2% of the cesium vapor content of the initial cover gas stream, representing a reduction of at least about 98 percent.

23 Claims, 1 Drawing Sheet

(56) References Cited

U.S. PATENT DOCUMENTS

| | | | |
|---|---|---|---|
| 4,047,040 A | 9/1977 | Houston | |
| 4,047,101 A | 9/1977 | Bauerle et al. | |
| 4,095,171 A | 6/1978 | Bauerle et al. | |
| 4,117,396 A | 9/1978 | Berkey et al. | |
| 4,119,488 A | 10/1978 | Barosi | |
| 4,121,458 A | 10/1978 | Fort | |
| 4,131,511 A | 12/1978 | Mordarski | |
| 4,195,891 A | 4/1980 | Hellier | |
| 4,257,847 A * | 3/1981 | Gibby | G21C 3/17 376/418 |
| 4,325,029 A | 4/1982 | Hrizo et al. | |
| 4,366,438 A | 12/1982 | Ibe et al. | |
| 4,578,242 A | 3/1986 | Sharma | |
| 4,587,083 A | 5/1986 | Colburn | |
| 4,710,343 A * | 12/1987 | Christiansen | G21C 3/17 376/418 |
| 4,719,355 A | 1/1988 | Meyers et al. | |
| 4,782,235 A | 11/1988 | Lejeune et al. | |
| 4,845,364 A | 7/1989 | Alexander et al. | |
| 4,853,177 A | 8/1989 | Pettus | |
| 4,984,952 A | 1/1991 | Reuter | |
| 5,030,411 A | 7/1991 | Cooper | |
| 5,820,681 A | 10/1998 | Colombo et al. | |
| 6,030,458 A | 2/2000 | Colombo | |
| 6,117,208 A | 9/2000 | Sharma | |
| 6,316,773 B1 | 11/2001 | Giakos | |
| 6,602,919 B1 | 8/2003 | Collins | |
| 6,840,085 B1 | 1/2005 | Kolaja et al. | |
| 7,794,630 B2 | 9/2010 | Cattaneo et al. | |
| 7,842,194 B2 | 11/2010 | Giannantonio et al. | |
| 8,123,862 B2 | 2/2012 | Ohara | |
| 8,308,866 B2 | 11/2012 | Negishi | |
| 8,421,470 B2 | 4/2013 | Kitano et al. | |
| 8,502,158 B1 | 8/2013 | Gordeev et al. | |
| 9,178,103 B2 | 11/2015 | Wu et al. | |
| 9,341,596 B1 | 5/2016 | Chen et al. | |
| 9,921,184 B2 | 3/2018 | Corbin et al. | |
| 10,636,532 B2 | 4/2020 | Anderson et al. | |
| 10,685,750 B2 | 6/2020 | Eichel et al. | |
| 2003/0127053 A1 | 7/2003 | Kim | |
| 2003/0201586 A1 | 10/2003 | Kim | |
| 2009/0277390 A1 | 11/2009 | Soininen | |
| 2013/0010915 A1 | 1/2013 | Garnier et al. | |
| 2014/0007814 A1 | 1/2014 | Villette et al. | |
| 2015/0314240 A1 * | 11/2015 | Loewen | B01D 59/50 96/4 |
| 2016/0141058 A1 * | 5/2016 | Barker | B01J 20/0251 210/259 |
| 2016/0208374 A1 | 7/2016 | Lattimer | |
| 2016/0320334 A1 | 11/2016 | Nakatou et al. | |
| 2017/0263339 A1 | 9/2017 | Eichel et al. | |
| 2017/0337955 A1 * | 11/2017 | Chen | G11C 7/222 |
| 2017/0337995 A1 | 11/2017 | Anderson et al. | |
| 2020/0105428 A1 | 4/2020 | Corbin et al. | |
| 2020/0258644 A1 | 8/2020 | Anderson et al. | |

FOREIGN PATENT DOCUMENTS

| | | |
|---|---|---|
| CN | 107402251 B | 5/2022 |
| EP | 0508715 A1 | 10/1992 |
| GB | 1141083 A | 1/1969 |
| GB | 1368452 A | 9/1974 |
| GB | 2031216 A | 4/1980 |
| GB | 2005900 B | 1/1982 |
| GB | 2113901 A | 8/1983 |
| GB | 2183893 A | 6/1987 |
| JP | S5015204 B1 | 6/1975 |
| JP | S51107212 A | 9/1976 |
| JP | S51140875 A | 12/1976 |
| JP | S5551396 A | 4/1980 |
| JP | S6043447 A | 3/1985 |
| JP | S61228382 A | 10/1986 |
| JP | S62182434 A | 8/1987 |
| JP | 01123198 A | 5/1989 |
| JP | H02183199 A | 7/1990 |
| JP | 1992286996 | 10/1991 |
| JP | H0469592 A | 3/1992 |
| JP | 1992122897 | 4/1992 |
| JP | H04122897 A | 4/1992 |
| JP | H04206243 A | 7/1992 |
| JP | H04286996 A | 10/1992 |
| JP | H05100065 A | 4/1993 |
| JP | H09243530 A | 9/1997 |
| JP | 2863939 B2 | 3/1999 |
| JP | H11504613 A | 4/1999 |
| JP | 2008537022 A | 9/2008 |
| JP | 2008231194 A | 10/2008 |
| JP | 2012032250 A | 2/2012 |
| JP | 2014089102 A | 5/2014 |
| KR | 10-2012-0102666 A | 9/2012 |
| RU | 2328783 C1 | 7/2008 |
| SU | 693868 A1 | 8/1984 |

OTHER PUBLICATIONS

Bechtold, R.A., et al., FFTF Cesium Trap Design, Installation, and Operating Experience, Fourth International Conference on Liquid Metal Technology, Avignon, France, Oct. 18, 1988. Date Published Jun. 1988, 12 pages.

Breitwieser et al., Saha-Langmuir Surface Ionization Relation, thermionic Conversion Specialist Conference sponsored by the Institute of Electrical and electronics Engineers, San Diego, CA Oct. 25-27, 1965, 13 pages.

Cesium Getter Development—Poster, TerraPower, LLC.

Chandran et al., Performance Testing of in-sodium sensors and simulated experiments in, sodium chemistry loop; Nuclear Engineering Design 268 (2014) 1-9.

Dunn et al., Calculation of Electrical and Thermal Conductivities of Metallurgical Plasmas, Bulletin, Welding Research council (U.S.), 357, 21 pages, 1990.

Hrizo et al., Sodium Ionization Detector and Sensor, Final Technical Report, Westinghouse Research and Development Center, Contract EN-77-C-02-4197.A000 Department of Energy, May 8, 1979, 51 pages.

International Atomic Energy Agency Radioactive Sodium Waste Treatment and Conditioning, IAEA, Vienna, 2007, IAEA-TECDOC-1524, ISBN 92-0-116006-2, ISSN 1011-4289, 68 pages.

Jow, "Yucca Mountain Project-Science & Technology Radionuclide Absorbers Development Program Overview", Yucca Mountain Project, Las Vegas, NV (United States), 2005.

Lamgmuir et al., Thermionic Effects Caused by Vapours of Alkali Metals, Proc. of the Royal Society A Mathematical Physical Engineering Sciences, 107, doi: 10.1098/rspa. 1025.0005, published Jan. 1, 1925, 20 pages.

Lau, J., Electrical Conductivity of Inert Gases—Seed Combination in Shock Tubes, Defense Documentation Center for Scientific and technical Information, DDC No. 445232, Aug. 1964, 21 pages.

Morris et al., An Evaluation of Liquid Metal Leak Detection Methods for the Clinch River Breeder Reactor Plant, Prepared for the US Nuclear Regulatory Commission under Related Services Contract 8D08 to the Prime Contract CY-76-C-06-1830 with the Department of Energy, Dec. 1977, 121 pages.

Mozgovoy et al., New Equations of state and the Tables of Cesium Vapor Thermodynamic Properties at Temperatures 1700K and Pressure 5.5 Mpa, Chemistry and Computational Simulation. Butlerov Communications, vol. 3. No. 10, pp. 36-38, 2001.

PCT/US2017/021125 International Search Report and Written Opinion mailed Nov. 21, 2017, 22 pages.

PCT/US2017/033578 International Search Report and Written Opinion mailed Mar. 6, 2018, 16 pages.

PCT/US2018/025216 International Search Report and Written Opinion mailed Sep. 18, 2018, 10 pages.

PCT/US2020/042905 International Search Report and Written Opinion mailed Nov. 4, 2020, 15 pages.

RDT Standard, Vapor Trap Assemblies for Sodium Service, Apr. 1972, 66 pages.

(56) References Cited

OTHER PUBLICATIONS

Romanenko et al., Immobilization of Cesium Traps from the BN-350 Fast Reactor, WM2011 Conference, Feb 27-Mar. 3, 2011, Phoenix, AZ., pp. 1-15.
Romanenko, O.G., et al., Cleaning Cesium Radionuclides from BN-350 Primary Sodium, Nuclear Technology, Published online: Apr. 10, 2017, 22 pages.
Schuck, W. J., A Summary of Sodium Vapor Trap Experience at the Fast Flux Test Facility, IAEA Specialists Meeting on Fast Reactor Cover Gas Purification, pp. 262-273, https://www.osti.gov/etdeweb/servlets/purl/20236827, Sep. 1986 (Sep. 1986).
Sobolev, A. et al., "Purification of the Coolant of Fast Reactors from Cesium", Atomic Energy, 72(3): 220-224 (1992).
Sodium Cesium Ion Detector Lab Poster 2015.
Studart et al., Processing Routes to Macroporous Ceramics: A Review, J. Am. Ceram. Soc. 89[6], pp. 1771-1789, 2006.
Swaminathan et al., Development of a sodium ionization detector for sodium-to-gas leaks, United Kingdom: British Nuclear Energy Society, 1984.
Sylvia et al., Development of Sodium Leak Detectors for PFBR, Nuclear Engineering and Design 249 (2012) 419-431.
Vaidyanathan et al., Sensors in Sodium Cooled Fast Breeder Reactors, National Journal of Electronic Sciences Systems, vol. 3, No. 2, Oct. 2012, 10 pages.
Wahlquist, D.R., et al., Equipment Design Guidelines for Remote Hot Cell Operations, Argonne National Laboratory-West, American Glovebox Society 11th Annual Conference Orlando, Florida Jul. 12-15, 1998, 11 pages.
Wolson, et al., Development of on-line Monitoring Device to Detect the Presence/Absence of Sodium Vapor, ANL—83-21, Mar. 1983, 18 pages.
Yamamoto et al., Development of Fluctuation Monitor Type Sodium Ionization Detector, Journal of Nuclear Science and Technology, 23:7, 573-581, 1986.
Yamamoto et al., Using Anemometer for Particle Size Measurement of Sodium Mist, Journal of Nuclear Science and Technology, 16:8, 616-618, 1979.
PCT/US2023/019006 International Search Report and Written Opinion mailed Jan. 8, 2023.
European Application 23178410.9 Extended European Search Report dated Sep. 11, 2023.
Song et al., "Fractional Release Behavior of Volatile and Semivolatile Fission Products During a Voloxidation and Oreox Treatment of Spent PWR Fuel", Nuclear Technology, American Nuclear Society, vol. 162, No. 2, May 1, 2008, pp. 158-168, XP009177092, ISSN: 0029-5450.

\* cited by examiner

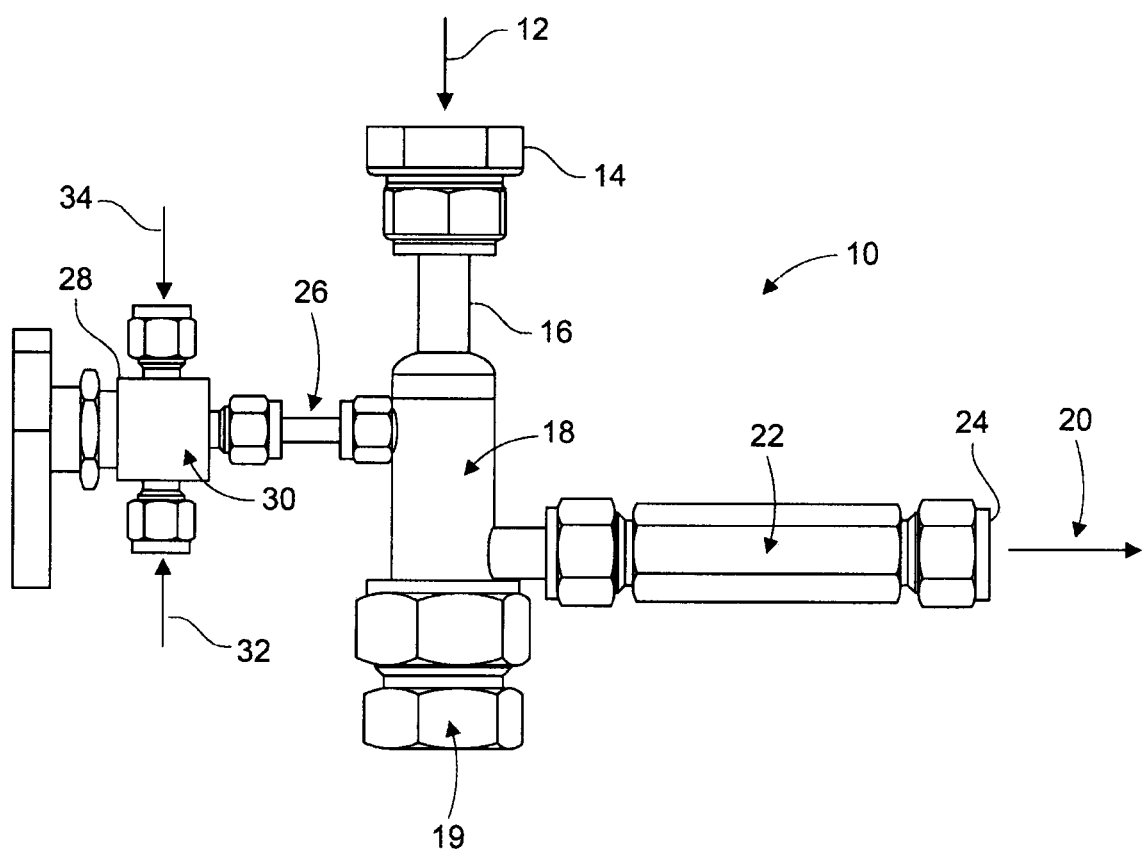

OXIDATION OF CESIUM AS METHOD FOR REMOVING CESIUM VAPOR FROM COVER GAS IN NUCLEAR REACTORS

CROSS-REFERENCE TO RELATED APPLICATIONS

This application claims the benefit of U.S. Provisional Patent Application No. 63/388,981, filed Jul. 13, 2022, entitled "OXIDATION OF CESIUM AS METHOD FOR REMOVING CESIUM VAPOR FROM COVER GAS IN NUCLEAR REACTORS", the contents of which is incorporated herein by reference in its entirety.

GOVERNMENT LICENSE RIGHTS

This invention was made with government support under DOE Cooperative Agreement No. DE-NE0009054 awarded by the U.S. Department of Energy. The government has certain rights in the invention.

FIELD OF THE DISCLOSURE

This disclosure is directed to an improved process for removing radioactive cesium from the inert cover gas in nuclear reactors which includes oxidizing the cesium vapor in the cover gas to generate cesium oxide particles which are removed by mechanical filtration.

BACKGROUND

Radioactive cesium-134 and cesium-137 can be present in the coolant of sodium-cooled fast reactors and can migrate to the cover gas, typically argon, due to the high vapor pressure of elemental cesium. Cesium has a relatively high vapor pressure at expected cover gas temperatures of 20° C. to 550° C., and cesium vapor can be carried by the cover gas through the vapor condenser and aerosol filters and can accumulate on or in the downstream pipes, valves and equipment in the radiological gas processing system. Enough cesium can be transported to create radiation dose concerns for maintenance workers.

Many nuclear reactors are equipped with sodium coolant processing systems that include filters positioned within the stream of cooling fluid for removing cesium and other radioactive fission by-products. However, enough cesium can still evaporate into the cover gas system to cause dosage concerns for workers. For example, dosage rates of up to 320 mrem per hour for cesium-134 and up to 13 rem per hour for cesium-137 have been found in the vicinity of downstream processing equipment such as piping, service valves and compressor cells. This and other downstream processing equipment requires routine maintenance, in part due to the cesium accumulation. The performance of such maintenance requires high-level precautions in order to avoid exposing maintenance workers to unacceptable radiation dosages.

An example of a known nuclear reactor filter is described in U.S. Publication 2017/0263339, published on Sep. 14, 2017, to Eichel et al. The '339 publication discloses embodiments of a getter element for removing one or more fission products from a cooling fluid stream of gas and/or liquid within a nuclear reactor. The getter element includes one or more internal passages that facilitate a continuous throughput of the cooling fluid, and getter material that chemically reacts with a target fission product to remove the fission product from the flow. Disclosed fission products include cesium and cesium-based compounds, rubidium and rubidium-based compounds, strontium and strontium-based compounds, and iodine and iodine-based compounds. Disclosed getter materials include zirconium oxides, titanium oxides, niobium oxides, and tantalum oxides. However, as explained above, known filters positioned in the cooling fluid stream have not been sufficient to prevent significant amounts of uncaptured cesium vapor from passing into the cover gas stream, which in turn can accumulate on or in downstream equipment and cause dosage concerns for maintenance workers.

SUMMARY

Embodiments of the present disclosure are directed to a method for removing cesium vapor from a stream of cover gas in a nuclear reactor, using oxidizing and filtration apparatus that are placed within the cover gas stream. According to some embodiments, the method may not be intended to replace any of the filtration apparatus or methods that are conventionally employed in the stream of cooling fluid but is directed to the removal of cesium that nevertheless escapes from the cooling fluid into the cover gas stream before it can pass into the downstream processing equipment.

Cesium has a boiling temperature of 670° C., but due to a high vapor pressure, it will evaporate and entrain itself within a cover gas stream at much lower temperatures, including temperatures ranging from about 20° C. to about 550° C. that can be found at various locations in the cover gas stream of any of a number of nuclear reactors. This has resulted in cover gas streams containing an inert gas, typically argon, which carry small but radioactively significant amounts of cesium-134, whose half-life is 2.1 years, and cesium-137, whose half-life is 30 years. In representative examples, at a high cover gas temperature of about 550° C., the cesium vapor can have a mole fraction in the cover gas of up to about $2.2 \times 10^{-10}$ which correspondingly results in partial pressures of up to about $2.2 \times 10^{-10}$ atmospheres in nuclear reactor cover gas streams operating at ambient pressure. Over time, even a small concentration of cesium vapor can condense and accumulate significantly in the downstream processing equipment, requiring removal.

In accordance with the disclosed method, a cover gas stream including an inert cover gas and cesium vapor is provided in a nuclear reactor. The cover gas stream includes a first mole fraction of cesium vapor which can be up to about $2.2 \times 10^{-10}$ as in the representative examples or can be any mole fraction that is typically encountered within various embodiments of nuclear reactors. The method further includes the steps of oxidizing the cesium vapor in the cover gas stream to yield cesium oxide ($Cs_2O$) particles which have very low vapor pressure and removing the cesium oxide particles from the cover gas stream using a particle filter that is located in the cover gas stream, to yield a filtered cover gas. The filtered cover gas stream can have a second mole fraction of cesium vapor that is zero to about 2%, or zero to about 0.2%, or zero to about 0.02%, or zero to about 0.002%, or zero to about 0.0002% of the first mole fraction of cesium vapor.

In some embodiments, the step of oxidizing the cesium vapor in the cover gas stream includes reacting the cesium vapor with a metal oxide to form cesium oxide particles. The metal oxide can have a first Gibbs free energy and the cesium oxide particles can have a second Gibbs free energy. The difference between the Gibbs free energies of two solid metal oxides correspond to the differences in Gibbs free energy of formation ($\Delta G_f$), which are known and published for various metal oxides using reference conditions of 298° K (25° C.) and 1 atmosphere of pressure. The metal oxide can be selected so that the first Gibbs free energy is higher than the second Gibbs free energy or, stated otherwise, the first Gibbs free energy of formation is higher than the second Gibbs free energy of formation. This selection of metal oxide assists in enabling the chemical reaction to proceed spontaneously in the temperature environments of about 20° C. to about 400° C. that typically exist in the cover gas processing streams of nuclear reactors.

Suitable metal oxides that have a Gibbs free energy of formation higher than the Gibbs free energy of formation of cesium oxide ($Cs_2O$) include without limitation selected oxides of copper, bismuth, antimony, lead, nickel, selenium, tellurium, cobalt, and combinations thereof. By "selected oxides" it is understood that some, but not all oxides of these metals can be selected as having a Gibbs free energy of formation that is higher than the Gibbs free energy of formation of cesium oxide. Suitably, the selected metal oxide will be stable in a low-oxygen or oxygen-free environment at the operative temperature. Suitable oxides of copper, which are "selected oxides," include cuprous oxide ($Cu_2O$), cupric oxide (CuO), and combinations thereof.

Oxides of bismuth include bismuth oxide ($Bi_2O_3$) and ($Bi_3O_4$), which may be a "selected oxide." Oxides of antimony include diantimony tetroxide ($Sb_2O_4$) and antimony pentoxide ($Sb_2O_5$), which may qualify as selected oxides, as well as and antimony trioxide ($Sb_2O_3$) and antimony hexatridecoxide ($Sb_6O_{13}$), which do not. Oxides of lead include lead monoxide (PbO) and lead dioxide ($PbO_2$), both of which are selected oxides, and lead (III, IV) oxide ($Pb_3O_4$), which is not a selected oxide. Oxides of nickel may include nickel (II) oxide (NiO), a selected oxide, and nickel (III) oxide ($Ni_2O_3$). Oxides of selenium may include selenium dioxide ($SeO_2$), selenium trioxide ($SeO_3$), diselenium pentoxide ($Se_2O_5$), and combinations thereof. Oxides of tellurium may include tellurium dioxide ($TeO_2$), which is marginally a selected oxide. Oxides of cobalt include cobaltous oxide (CoO), which is a selected oxide, and cobaltic oxide ($Co_2O_3$) and cobalt (II, III) oxide ($Co_3O_4$), which are not selected oxides. To the extent thermodynamics favors the reactions, as determined from the relative Gibbs free energies of formation of the metal oxides versus cesium oxide, the metal oxides can react with stoichiometric amounts of cesium vapor to yield cesium oxide ($Cs_2O$) and the metallic element (Cu, Ag, Bi, Sb, Pb, Ni, Se, Te, and/or Co), or a partially reduced version of the metal oxide. For example, CuO can be partially reduced to $Cu_2O$.

In some embodiments, the metal oxide can be an oxide of copper selected from cuprous oxide ($Cu_2O$), cupric oxide (CuO), and combinations thereof. Cuprous oxide and cupric oxide can react with cesium vapor to yield cesium oxide particles and copper metal and/or a partially reduced version of the oxide, according to the following exemplary equations:

$$4Cs+Cu_2O \rightarrow 2Cs_2O+2Cu$$

$$2Cs+CuO \rightarrow Cs_2O+Cu$$

$$2CuO+2Cs \rightarrow Cs_2O+Cu_2O$$

Based on known data, cesium oxide has a Gibb's free energy of formation ($\Delta G_f$) of −308.36 kJ/mole. By comparison, cuprous oxide and cupric oxide have respective $\Delta G_f$ values of −146.03 kJ/mole and −129.56 kJ/mole, at 25° C. and 1 atmosphere pressure. See Robie et al., "*Thermodynamic Properties of Minerals and Related Substances at 298.15 K and 1 Bar ($10^5$ Pascals) Pressure and at Higher Temperatures*," U.S. Geological Survey Bulletin 1452, Department of the Interior (1984). Because cesium oxide has a much lower Gibbs free energy of formation than the oxides of copper, the thermodynamics strongly favor the formation of cesium oxide from the oxides of copper.

Some oxides of the listed metal elements do not have higher Gibbs free energies of formation than cesium oxide and are not among the selected group. The following table shows the Gibbs free energies of formation for some selected oxides of these metal elements, and some that are not in the selected group, based on the foregoing U.S. Geological Survey Bulletin 1452. A higher or "less negative" Gibbs free energy of formation corresponds to a higher Gibbs free energy in a compound.

TABLE 1

| Gibb's Free Energy of Formation for Metal Oxides | |
|---|---|
| Metal Oxide | $\Delta G_f$, KJ/mole at 25° C. and 1 atmosphere |
| $Cs_2O$ | −308.36 |
| $Cu_2O$ | −146.03 |
| CuO | −129.06 |
| CoO | −214.19 |
| NiO | −211.71 |
| PbO | −189.20 |
| $PbO_2$ | −215.31 |
| $TeO_2$ | −270.37 |
| $Pb_3O_4$ (not selected) | −601.36 |
| $Bi_2O_3$ (not selected) | −493.45 |
| $Co_3O_4$ (not selected) | −794.96 |
| $Sb_2O_3$ (not selected) | −626.35 |

In some embodiments, the metal oxide can be provided in the form of a porous material located in the cover gas stream, and the cesium vapor can react with the metal oxide as the cover gas stream passes through the porous material. For example, the porous material that includes the metal oxide can be a packing material, wool, mesh, or screen material. The cesium vapor can react with the metal oxide in the porous material to form the cesium oxide particles.

Once the cesium oxide particles are formed by reacting the metal oxide with the cesium vapor, the cesium oxide particles can be removed from the cover gas stream using a particle filter, to yield a filtered cover gas stream. In some embodiments, the porous material that includes the metal oxide can serve as the particle filter, or a first stage of a two-stage particle filter, which not only reacts with the cesium vapor to form cesium oxide particles, but also retains at least some or all of the cesium oxide particles and removes them from the cover gas stream. For example, a packing material, wool, mesh, screen, powder, and/or granules that can be formed from an oxide of copper or another suitable metal oxide can serve as a particle filter that retains at least some of the cesium oxide particles as they are being formed.

In some embodiments, the particle filter can include a particle filter, or a second stage of a two-stage particle filter, which is separate from the porous material used to react the cesium vapor with the metal oxide to form the cesium oxide particles. When used, the separate particle filter can include physical constraints that are designed to capture small particles of cesium oxide. For example, the separate particle filter can include a mesh screen or series of screens having openings of less than about 20 microns, or less than about 15 microns, or less than about 10 microns, or about 5 microns to about 10 microns. The separate particle filter can also be placed in the cover gas stream so that the cover gas exits the particle filter as a filtered cover gas stream.

In some embodiments, the separate particle filter can also include a suitable metal oxide that can react with any residual cesium vapor that passes through the reactive porous material yet remains entrained in the cover gas stream. For example, the separate particle filter can include an oxide of copper or another suitable metal oxide as a material of construction for a mesh screen or series of screens, or in addition to the screen(s).

In some embodiments, the cover gas stream includes the inert gas, such as argon, and a first molar concentration of cesium vapor. The filtered cover gas stream includes the inert gas and a second molar concentration of cesium vapor. Depending on the temperature of the cover gas stream and other conditions where the reaction occurs, the second molar concentration of cesium vapor can be zero to about 2% of the first molar concentration of cesium vapor, or zero to about 0.2% of the first molar concentration of cesium vapor, or zero to about 0.02% of the first molar concentration of cesium vapor, or zero to about 0.002% of the first molar concentration of cesium vapor or zero to about 0.002% of the first molar concentration of cesium vapor.

The foregoing target concentrations of cesium vapor were verified using FactSage$^R$ thermochemical software and a starting molar concentration of $1.0 \times 10^6$ cesium vapor in argon cover gas at 1 atmosphere of pressure. At 1 atmosphere of pressure, the molar concentration of cesium vapor would correspond to its partial pressure in atmospheres and can be approximated at $1 \times 10^{-6}$ atmospheres for this example. Using the FactSage$^R$ thermochemical software, the following partial pressures can be expected to result at equilibrium conditions following the reaction between cesium vapor and cupric oxide (CuO):

TABLE 2

Equilibrium of CuO + Cs + Ar Starting from $1 \times 10^{-6}$ Molar Cs Con.

| Temperature, °C. | Cs partial pressure, atm | $Cs_2O$ partial pressure, atm | Cs % of original |
|---|---|---|---|
| 20 | $1.95 \times 10^{-27}$ | $4.94 \times 10^{-37}$ | $1.95 \times 10^{-19}$ |
| 100 | $1.29 \times 10^{-20}$ | $2.33 \times 10^{-27}$ | $1.29 \times 10^{-12}$ |
| 200 | $2.39 \times 10^{-15}$ | $6.33 \times 10^{-20}$ | $2.39 \times 10^{-7}$ |
| 300 | $6.24 \times 10^{-12}$ | $3.92 \times 10^{-15}$ | $6.24 \times 10^{-4}$ |
| 400 | $1.54 \times 10^{-9}$ | $8.39 \times 10^{-12}$ | 0.154 |

The foregoing modeling was repeated for the reaction between cesium vapor and cuprous oxide ($Cu_2O$), using the same conditions and assumptions. Using the FactSage$^R$ thermochemical software, the following partial pressures can be expected to occur at equilibrium conditions for the reaction between cesium vapor and cuprous oxide ($Cu_2O$):

TABLE 3

Equilibrium of $Cu_2O$ + Cs + Ar Starting from $1 \times 10^{-6}$ Molar Cs Con.

| Temperature, °C. | Cs partial pressure, atm | $Cs_2O$ partial pressure, atm | Cs % of original |
|---|---|---|---|
| 20 | | | |
| 100 | $1.05 \times 10^{-17}$ | $2.33 \times 10^{-27}$ | $1.05 \times 10^{-9}$ |
| 200 | $6.94 \times 10^{-13}$ | $6.33 \times 10^{-20}$ | $6.94 \times 10^{-5}$ |
| 300 | $9.07 \times 10^{-10}$ | $3.92 \times 10^{-15}$ | 0.0272 |
| 400 | $1.36 \times 10^{-7}$ | $8.39 \times 10^{-12}$ | 1.36 |

From the foregoing Tables 2 and 3, it can be seen that the amount of cesium vapor in the cover gas stream can be reduced to levels that are negligible and, in some cases, undetectable using the oxidation process. Experimentation can be used to determine the optimum temperature of the cover vapor stream used to reach equilibrium reaction conditions, or as close to equilibrium as possible. As shown in the tables, the residual Cs partial pressure at equilibrium is expected to be much lower at lower temperatures. However, the reaction rate is also slower at lower temperatures, and longer times would be needed to reach equilibrium reaction conditions. The optimum placement of the reaction and filtration apparatus within the cover gas stream requires consideration of both the temperature and the time needed to complete the reaction at that location.

In some embodiments, the oxidation can be performed by direct injection of oxygen gas into the cover gas stream, whereupon the oxygen gas readily reacts with the cesium vapor to form cesium oxide particles. Only a small amount of oxygen gas may be needed to complete the following reaction, which is highly exothermic and can proceed spontaneously:

$$4Cs + O_2 \rightarrow 2Cs_2O$$

The direct injection of oxygen gas necessitates the use of a particle filter positioned in the cover vapor stream to remove the cesium oxide particles from the vapor stream. The particle filter can include any of the filter assemblies described above, and can include a mesh screen, series of screens, or other porous material having openings of less than about 20 microns, or less than about 15 microns, or less than about 10 microns, or about 5 to about 10 microns. In some embodiments, the particle filter can be formed using a suitable reactive metal oxide in order to facilitate capture of the cesium oxide particles and any remaining cesium vapor that is entrained in the cover gas stream.

The foregoing and other features of the disclosure will become further apparent from the following detailed description, read in conjunction with the drawing.

BRIEF DESCRIPTION OF THE DRAWING

FIG. 1 schematically illustrates one embodiment of a reaction and filtration apparatus that can be placed in the cover gas stream to perform exemplary embodiments of the disclosed method.

DETAILED DESCRIPTION

Referring to FIG. 1, an exemplary reaction and filtration apparatus 10 can be placed in the cover gas stream 12 of a nuclear reactor and can be used to practice exemplary embodiments of the disclosed method. The cover gas stream 12 includes an inert cover gas, which may be argon in some cases, and can contain small but radioactively significant amounts of cesium-134 and cesium-137 (collectively cesium) in the vapor form. Depending on the type and condition of the nuclear reactor, the cover gas stream 12 can contain a first concentration of up to about $2.2 \times 10^{-10}$ moles of cesium vapor per mole of cover gas but is not limited to these concentrations for purposes of practicing the disclosed method. Assuming ideal gas behavior and a pressure of 1 atmosphere, the cesium present in these concentrations would exhibit a corresponding partial pressure of up to about $2.2 \times 10^{-10}$ atmospheres. The method of this disclosure is not limited to these partial pressures and is not limited to an overall pressure of 1 atmosphere but can be practiced under different pressures.

The reaction and filtration apparatus 10 can be placed at any location in the cover gas stream and can be placed in a selected location, for example, based on the cover gas temperature at that location. The cover gas temperature can typically range between about 20° C. and about 550° C. at various locations and in the cover gas processing systems of different nuclear reactors, and the disclosed methods are not limited to practice within this temperature range. Because the kinetics of the chemical reaction(s) of cesium vapor to cesium solid particles typically increase with increasing temperature, this factor may weigh in favor of placing the apparatus 10 in a higher temperature location of the cover gas stream. As used herein, the term "higher temperature location" refers to a location in which the cover gas stream is at a temperature of above 250° C. On the other hand, the chemical reaction may proceed to a greater equilibrium degree of completion at lower temperatures, which may weigh in favor of placing the apparatus 10 in a lower temperature location in the cover gas stream. The optimal placement of the apparatus 10 in the cover gas stream will depend on factors such as the amount or concentration of cesium vapor that needs to be removed, the flow rate and residence time of the cover gas stream within the apparatus 10, the specific type of reaction used to convert the cesium vapor to cesium oxide particles (whether by contact with metal oxide or direct injection of oxygen and, if a metal oxide is used, the specific type), and other factors. In some example embodiments, more than one apparatus 10 may be placed at selected locations within the cover gas stream. In some embodiments, a first apparatus is placed at a first location in the cover gas stream and a second apparatus may be placed at a second location in the cover gas stream. In some cases, the first location may have a higher cover gas stream temperature than the second location.

In some embodiments, the reaction and filtration apparatus 10 can be heated or cooled to achieve a desired reaction and/or filtration temperature. In some embodiments, selected portions of the reaction and filtration apparatus 10 can be heated or cooled to achieve desired reaction and/or filtration temperatures in selected portions of the apparatus. A first and second apparatus may similarly be heated or cooled to different temperatures to achieve desired reaction and/or filtration temperatures in the first and second apparatus 10.

The cover gas stream 12 containing the first concentration of cesium vapor can enter the apparatus 10 at an inlet location 14 and can pass through a narrower necked portion 16 into a reaction chamber 18. In some embodiments, the reaction chamber 18 can be packed with a metal oxide material having a first Gibbs free energy of formation that is higher than a second Gibbs free energy of formation of cesium oxide solid. The metal oxide can be in the form of any porous material and can, for example, include at least one of a packing material, wool, mesh, screen, powder, and/or granules, among other designs. The porous material can be formed of the metal oxide or can be formed of another material, for example stainless steel, and can have particles of the metal oxide dispersed within it.

In some embodiments, the metal oxide material can be an oxide of copper, an oxide of bismuth, an oxide of antimony, an oxide of lead, an oxide of nickel, an oxide of selenium, an oxide of tellurium, and/or an oxide of cobalt, or combinations of one or more oxides. In some embodiments, the metal oxide material can include an oxide of copper selected from cupric oxide, and cuprous oxide, and combinations thereof. In some embodiments, the metal oxide material can be cupric oxide. In some embodiments, the metal oxide material can be cuprous oxide. In some embodiments, the metal oxide material can be a mixture or other combination of cupric oxide and cuprous oxide. In some embodiments, more than one metal oxide can be provided in the apparatus 10. In some cases a first metal oxide or combination of metal oxides can be provided in a first apparatus 10, and a second metal oxide or combination of metal oxides can be provided in a second apparatus 10.

As the cover gas vapor passes through the reaction chamber 18, the cesium vapor can react with the metal oxide to yield cesium oxide particles and elemental metal and/or a reduced version of the metal oxide. For example, when the metal oxide is cuprous oxide, the reaction may proceed as follows:

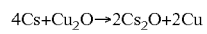

$$4Cs+Cu_2O \rightarrow 2Cs_2O+2Cu$$

In another example, when the metal oxide is cupric oxide, the reaction may proceed as follows:

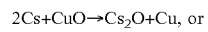

$$2Cs+CuO \rightarrow Cs_2O+Cu, \text{ or}$$

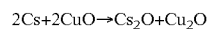

$$2Cs+2CuO \rightarrow Cs_2O+Cu_2O$$

The resulting cesium oxide particles can then be filtered from the cover gas stream using a particle filter located in the cover gas stream, yielding a filtered cover gas stream 20. In some embodiments, the porous metal oxide material located in the reaction chamber 18 can also serve as the particle filter, or as a component of the particle filter, whereupon the metal oxide particles can remain entrained in the porous material. In some embodiments, the apparatus 10 may also include a separate particle filter 22 that is designed for the removal of small particles. The particle filter 22 can be located downstream of the reaction chamber 18, between the reaction chamber 18 and an exit opening 24 of the apparatus 10. The particle filter 22 can operate as a primary filter (if the reaction chamber 18 performs little or no filtration) or can operate as a secondary filter (if the porous material in the reaction chamber 18 performs substantial filtration of the metal oxide particles). The reaction chamber 18 can include an end cap 19 or other mechanism that directs the cover gas stream toward the particle filter 22.

In some embodiments, the particle filter 22 can include a screen, a series of screens, or another porous material having openings of less than about 20 microns, or less than about 15 microns, or less than about 10 microns, or about 5 to about 10 microns. The particle filter can be formed using a durable screen material, for example, stainless steel.

Alternatively, in some embodiments, the particle filter can be formed using a suitable reactive metal oxide in order to facilitate capture of the cesium oxide particles and any remaining cesium vapor that is entrained in the cover gas stream.

In some embodiments, the reaction and filtration apparatus 10 can include an oxygen supply system 28 which can be isolated and controlled using a check valve 30, and a flow meter located in an auxiliary inlet line 26. When the reaction chamber 18 is packed with a porous material containing a reactive metal oxide, a separate source of oxygen may not be needed and the apparatus 10 can operate with the check valve 30 and the inlet line 26 being closed. In alternative embodiments, the reaction chamber 18 may not include a metal oxide material and the oxygen supply system 28 can be used to convert the cesium vapor to cesium oxide particles according to the following exothermic reaction:

$$4Cs + O_2 \rightarrow 2Cs_2O$$

In order to regulate the supply of oxygen, which is highly reactive, the check valve 30 can be a three-way check valve and can selectively open, close and regulate an incoming stream 32 of air mixed with an inert gas, for example argon, and an incoming stream 34 of pure inert gas, for example argon. The reaction of cesium with oxygen can occur spontaneously and can proceed energetically if too much oxygen or heat is added to the reaction chamber 18. Careful control of the oxygen supply, using additional argon as a diluent, can control the reaction to manageable levels while successfully converting the cesium vapor to cesium oxide particles.

In embodiments where cesium is reacted with oxygen gas in the reaction chamber 18, the reaction chamber 18 may not perform a filtration function. In these embodiments, the particle filter 22 can serve as the primary and/or only filter for removing cesium oxide particles from the cover gas stream, yielding a filtered cover gas stream 20 that exits through the outlet 24.

The disclosed method provides a highly effective method for removing cesium vapor from the cover gas streams of nuclear reactors. The incoming cover gas stream includes the inert cover gas and a first molar concentration of cesium vapor. The filtered cover gas stream includes the inert cover gas and a second molar concentration of cesium vapor which can range from zero to about 2% of the first molar concentration. In some embodiments, the second molar concentration of cesium vapor can range from zero to about 0.2%, or zero to about 0.02%, or zero to about 0.002%, or zero to about 0.0002% of the first molar concentration of cesium vapor.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments but should be defined only in accordance with the following claims and their equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

Unless otherwise noted, the terms "a" or "an," as used in the specification, are to be construed as meaning "at least one of" Finally, for ease of use, the terms "including" and "having" (and their derivatives), as used in the specification, are interchangeable with and have the same meaning as the word "comprising."

From the foregoing, and the accompanying drawings, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A method for removing cesium from a cover gas stream in a nuclear reactor, comprising the steps of:
   providing a cover gas stream including an inert cover gas and cesium vapor in a nuclear reactor;
   oxidizing the cesium vapor in the cover gas stream to form cesium oxide particles; and
   removing the cesium oxide particles from the cover gas stream using a particle filter located in the cover gas stream to yield a filtered cover gas stream.

2. The method of claim 1, wherein the step of oxidizing the cesium vapor in the cover gas stream comprises reacting the cesium vapor with a metal oxide, the metal oxide has a first Gibbs free energy of formation, and cesium oxide has a second Gibbs free energy of formation that is lower than the first Gibbs free energy of formation.

3. The method of claim 2, wherein the metal oxide comprises an oxide of at least one of copper, bismuth, antimony, lead, nickel, selenium, tellurium, and cobalt.

4. The method of claim 2, wherein the step of oxidizing the cesium vapor comprises passing the cover gas stream through a porous material comprising the metal oxide.

5. The method of claim 4, wherein the porous material comprising the metal oxide includes at least one of a packing material, wool, mesh, screen material, powder, or granules.

6. The method of claim 1, wherein the step of oxidizing the cesium vapor in the cover gas stream comprises reacting the cesium vapor with an oxide of copper to yield the cesium oxide particles and copper metal or a reduced form of the copper oxide.

7. The method of claim 6, wherein the step of oxidizing the cesium vapor comprises passing the cover gas stream through a porous material comprising the oxide of copper.

8. The method of claim 7, wherein the porous material comprising the oxide of copper includes at least one of a packing material, wool, mesh, screen material, powder, or granules.

9. The method of claim 1, wherein the step of oxidizing the cesium vapor in the cover gas stream comprises reacting the cesium vapor with oxygen gas to yield the cesium oxide particles.

10. The method of claim 1, wherein the cover gas stream comprises the inert gas and a first molar concentration of the cesium vapor, the filtered cover gas stream comprises the inert gas and a second molar concentration of the cesium vapor, and the second molar concentration of cesium vapor is zero to about 2% of the first molar concentration of cesium vapor.

11. The method of claim 10, wherein the second molar concentration of cesium vapor is zero to about 0.2% of the first molar concentration of cesium vapor.

12. The method of claim 10, wherein the second molar concentration of cesium vapor is zero to about 0.02% of the first molar concentration of cesium vapor.

13. The method of claim 10, wherein the second molar concentration of cesium vapor is zero to about 0.002% of the first molar concentration of cesium vapor.

14. A method for removing cesium from a cover gas stream in a nuclear reactor, comprising the steps of:
providing a cover gas stream including an inert cover gas and cesium vapor in a nuclear reactor;
oxidizing the cesium vapor in the cover gas stream by reacting the cesium gas with at least one of a metal oxide and oxygen gas, to form cesium oxide particles; and
removing the cesium oxide particles from the cover gas stream using a particle filter located in the cover gas stream to yield a filtered cover gas stream.

15. The method of claim 14, wherein the step of oxidizing the cesium vapor in the cover gas stream comprises the steps of passing the cesium vapor through a porous metal oxide material located in the cover gas stream and reacting the cesium vapor with the metal oxide material to form the cesium oxide particles.

16. The method of claim 15, wherein the metal oxide material comprises an oxide of copper.

17. The method of claim 15, wherein the particle filter comprises the metal oxide material and the metal oxide material acts as a first filter that removes at least some of the cesium oxide particles from the cover gas stream.

18. The method of claim 17, wherein the particle filter further comprises a second filter and the second filter removes any residual cesium oxide particles from the cover gas stream.

19. The method of claim 14, wherein the step of oxidizing the cesium vapor in the cover stream comprises the step of adding oxygen gas to the cover stream and reacting the cesium vapor with the oxygen gas to form the cesium oxide particles.

20. A method for removing cesium from a cover gas stream in a nuclear reactor, comprising the steps of:
providing a cover gas stream including an inert cover gas and cesium vapor in a nuclear reactor;
providing a metal oxide in the cover gas stream having a first Gibbs free energy of formation;
oxidizing the cesium vapor in the cover gas stream by chemical reaction with the metal oxide to form particles of cesium oxide having a second Gibbs free energy of formation that is less than the first Gibbs free energy of formation; and
removing the cesium oxide particles from the cover gas stream using a filter located in the cover gas stream to yield a filtered cover gas stream.

21. The method of claim 20, wherein the metal oxide comprises at least one of an oxide of copper, an oxide of bismuth, an oxide of antimony, an oxide of lead, an oxide of nickel, an oxide of selenium, an oxide of tellurium, and an oxide of cobalt.

22. The method of claim 20, wherein the metal oxide comprises an oxide of copper selected from the group consisting of cupric oxide, cuprous oxide, and combinations thereof.

23. The method of claim 20, wherein the cover gas stream comprises the inert gas and a first molar concentration of the cesium vapor, the filtered cover gas stream comprises the inert gas and a second molar concentration of the cesium vapor, and the second molar concentration of cesium vapor is zero to about 0.002% of the first molar concentration of cesium vapor.

* * * * *